(12) United States Patent
Sankhla et al.

(10) Patent No.: US 12,721,266 B2
(45) Date of Patent: Sep. 1, 2026

(54) CLEANING ASSEMBLY FOR A COMBINE HARVESTER

(71) Applicant: DEERE & COMPANY, Moline, IL (US)

(72) Inventors: Dhairya Sankhla, Pune (IN); Daniel Jung, Saarbrüecken (DE)

(73) Assignee: Deere & Company, Moline, IL (US)

(*) Notice: Subject to any disclaimer, the term of this patent is extended or adjusted under 35 U.S.C. 154(b) by 560 days.

(21) Appl. No.: 18/144,961

(22) Filed: May 9, 2023

(65) Prior Publication Data

US 2023/0413726 A1 Dec. 28, 2023

(30) Foreign Application Priority Data

Jun. 28, 2022 (DE) ........................ 102022116062.9

(51) Int. Cl.
*A01D 41/12* (2006.01)
*A01D 41/127* (2006.01)
*A01F 12/44* (2006.01)
*A01F 12/46* (2006.01)

(52) U.S. Cl.
CPC ........ *A01D 41/1274* (2013.01); *A01F 12/446* (2013.01); *A01F 12/46* (2013.01)

(58) Field of Classification Search
CPC .. A01D 41/1274; A01D 45/10; A01D 75/282; A01F 12/446; A01F 12/46; A01F 12/442; A01F 12/444; A01F 12/448
See application file for complete search history.

(56) References Cited

U.S. PATENT DOCUMENTS 3,108,064 A * 10/1963 Grant .................. A01D 75/282 209/261
3,581,746 A * 6/1971 Louks ................. A01D 75/282 209/254
3,945,177 A * 3/1976 Scott ...................... A01D 45/10 56/503
2017/0086380 A1* 3/2017 Walter .................. A01F 12/444
2019/0174678 A1* 6/2019 Puryk .................. A01F 12/442

FOREIGN PATENT DOCUMENTS

DE 10 2018 219 864 B3 2/2020
EP 3498078 A1 6/2019
EP 3501259 A1 6/2019
EP 3556201 A1 10/2019
EP 3581746 A 12/2019
GB 922907 A 4/1963

* cited by examiner

*Primary Examiner* — Joseph M Rocca
*Assistant Examiner* — Robert E Pezzuto
(74) *Attorney, Agent, or Firm* — Taft Stettinius & Hollister LLP; Stephen F. Rost

(57) ABSTRACT

A cleaning assembly for a combine harvester including a vibrating floor conveyor for conveying crops. The vibrating floor conveyor is moved into a vibrating movement and is supported at the conveyors downstream end by hangers on a cleaning shoe. At least one sieve is arranged in the cleaning shoe that can be moved into a vibrating movement, and which can be exposed to an air flow by a blower. A rotatable transverse auger conveyor is arranged downstream of the vibrating floor conveyor and upstream of the sieve for lateral conveying of the crop and includes a shaft and conveying coils attached to the shaft, wherein the hangers are supported on the shaft of the transverse screw conveyor.

20 Claims, 3 Drawing Sheets

CLEANING ASSEMBLY FOR A COMBINE HARVESTER

RELATED APPLICATION

This application claims priority to DE 10 2022 116 062.9, filed Jun. 28, 2022, which is hereby incorporated by reference herein in its entirety.

FIELD OF THE DISCLOSURE

The present disclosure relates generally to a combine harvester and more particularly to a cleaning assembly for a combine harvester.

BACKGROUND

Combine harvesters are used to harvest grain. The above-ground parts of plants, such as soy, wheat or oats, are cut off or collected or stripped off, or the fruit stands of the plants, such as corn or sunflowers, are separated and fed to a threshing and separating device to separate the grain from the other components of the crop. After the threshing and separating process, there are still impurities in the grain, such as straw particles and chaff. The mixture of grain and impurities obtained during threshing and separating is therefore supplied with a cleaning via conveying devices, which usually includes an upper sieve and a lower sieve and optionally a pre-sieve.

The sieves are generally suspended on front and rear hangers in a cleaning shoe and are moved by means of an eccentric drive, as shown, for example, in EP 3 498 078 A1. In this way, the sieves are set into an oscillating back and forth movement, moving forward and backward and up and down on elliptical or circular paths. In addition, they are exposed to an air stream from below. This is achieved in such a way that the mixture is periodically thrown upwards on the sieve (at the upper reversal point of the orbit) and lands back on the sieve after a throwing parabola has been covered. Due to the airflow and the impact on the sieve after the throw, the heavier grain is separated from the lighter impurities.

The conveying devices used for transporting the harvested material from the threshing and separating devices for cleaning include auger bottoms (cf. DE 10 2018 219 864 B3) and/or vibrating floor conveyors, the latter being also set in an oscillating back and forth movement analogous to the sieves (see, for example, EP 3 498 078 A1 or EP 3 556 201 A1). For this purpose, the vibrating floor conveyors are suspended on swivelling hangers, at least one of which is actively set into a vibrating movement by a drive.

It was also proposed to install a transverse auger conveyor at the inlet of the cleaning assembly in order to convey the crop if necessary, e.g., when driving on a side slope, to the left or right (upslope) in order to supply the cleaning shoe as homogeneously as possible with harvested material over its width (GB 922 907 A, EP 3 501 259 A1).

Using the example of FIG. 2 of EP 3 501 259 A1, it can be seen that in the prior art separate bearings are provided for the arms for suspension of the vibrating floor conveyor on the one hand and for the transverse auger conveyor on the other on the cleaning shoe. A certain amount of effort is therefore required to support both elements separately on the cleaning shoe of the combine harvester.

SUMMARY

The present disclosure has set itself a goal of reducing the effort described above. A cleaning assembly for a combine includes a vibrating floor conveyor for conveying crops which can be set into a vibrating movement and which is mounted at its downstream end in a swivelling manner by hangers on a cleaning shoe, at least one sieve arranged in the cleaning shoe, which sieve can be moved into a vibrating movement and which can be loaded with an air flow by a blower, and an auger downstream of the vibrating floor conveyor and upstream of the sieve. The auger is driveable for lateral conveying of the crop, which auger includes a shaft and conveyor coils attached to it. The hangers are mounted on the shaft of the transverse auger conveyor.

In this way, the shaft not only performs the task of holding the conveyor coil of the transverse auger conveyor, but also supports the hangers. A separate support of the hangers on the cleaning shoe is thus not needed anymore.

In one implementation, there is provided a cleaning assembly for a combine harvester including a vibrating floor conveyor for conveying crops, which is configured to be moved into a vibrating movement and supported swivellingly at its downstream end on a cleaning shoe by hangers. The cleaning assembly further includes at least one sieve mounted in the cleaning shoe configured to be loaded with an air flow by a blower and a rotatable transverse auger conveyor arranged downstream of the vibrating floor conveyor and upstream of the sieve for lateral conveying of the crop. The transverse auger conveyor includes a shaft and an attached conveying coil, wherein the hangers are supported on the shaft of the transverse auger conveyor.

In some implementations, the cleaning assembly includes wherein the vibrating floor conveyor is configured to feed crop discharged from a separating device to the front and to the cleaning assembly.

In some implementations, the cleaning assembly includes wherein the transverse auger conveyor is arranged beneath the front dispensing edge of the vibrating floor conveyor.

In some implementations, the cleaning assembly includes wherein the shaft is releasably connected to an outer shaft section extending through a side wall of the cleaning shoe and there rotatably supported by a bearing.

In some implementations, the cleaning assembly includes wherein a motor for driving the shaft is coupled to the outer shaft section on the outer side of the cleaning shoe.

In some implementations, the cleaning assembly further includes shaft bearings for rotational support of the hanger, wherein shaft lock rings are provided on the outer sides of the shaft bearings for rotational support of the hangers and the shaft lock rings are coupled to the shaft for axially fixing the hangers to the shaft.

In some implementations, the cleaning assembly includes wherein between the shaft bearings a ring is mounted to the shaft for axially fixing the shaft bearings on the shaft.

In some implementations, the cleaning assembly includes wherein the rotation speed and direction of a motor for driving the shaft is automatically controllable based on at least one of a sensed laterally inclination of the combine or a sensed distribution of the grain over the width of the cleaning assembly.

In some implementations, the cleaning assembly includes wherein the transverse auger conveyor includes at least one of two oppositely directed conveyor coils on its two sides, a single conveyor coil over the entire width, or two separately driven conveyor coils on both sides.

In another implementation, there is provided a combine harvester including an axial threshing unit and a cleaning assembly located next to the axial threshing unit. The axial threshing unit is configured to receive crops, wherein the cleaning assembly includes a vibrating floor conveyor for conveying the crops, which is configured to be moved into a vibrating movement and supported swivellingly at its downstream end on a cleaning shoe by hangers and at least one sieve. The at least on sieve is mounted in the cleaning shoe which is configured to be loaded with an air flow by a blower and a rotatable transverse auger conveyor arranged downstream of the vibrating floor conveyor and upstream of the sieve for lateral conveying of the crop, the transverse auger conveyor including a shaft and an attached conveying coil, wherein in that the hangers are supported on the shaft of the transverse auger conveyor.

In some implementations, the combine harvester includes wherein the vibrating floor conveyor is configured to feed crop discharged from a separating device to the front and to the cleaning assembly.

In some implementations, the combine harvester includes wherein the transverse auger conveyor is arranged beneath the front dispensing edge of the vibrating floor conveyor.

In some implementations, the combine harvester includes wherein the shaft is releasably connected to an outer shaft section extending through a side wall of the cleaning shoe and there rotatably supported by a bearing.

In some implementations, the combine harvester includes wherein a motor for driving the shaft is coupled to the outer shaft section on the outer side of the cleaning shoe.

In some implementations, the combine harvester further includes shaft bearings for rotational support of the hanger, wherein shaft lock rings are provided on the outer sides of the shaft bearings for rotational support of the hangers and the shaft lock rings are coupled to the shaft for axially fixing the hangers to the shaft.

In some implementations, the combine harvester includes wherein between the shaft bearings a ring is mounted to the shaft for axially fixing the shaft bearings on the shaft.

In some implementations, the combine harvester includes wherein the rotation speed and direction of a motor for driving the shaft is automatically controllable based on at least one of a sensed laterally inclination of the combine or a sensed distribution of the grain over the width of the cleaning assembly.

In some implementations, the combine harvester includes wherein the transverse auger conveyor includes at least one of two oppositely directed conveyor coils on its two sides, a single conveyor coil over the entire width, or two separately driven conveyor coils on both sides.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

DETAILED DESCRIPTION

Figure 1:
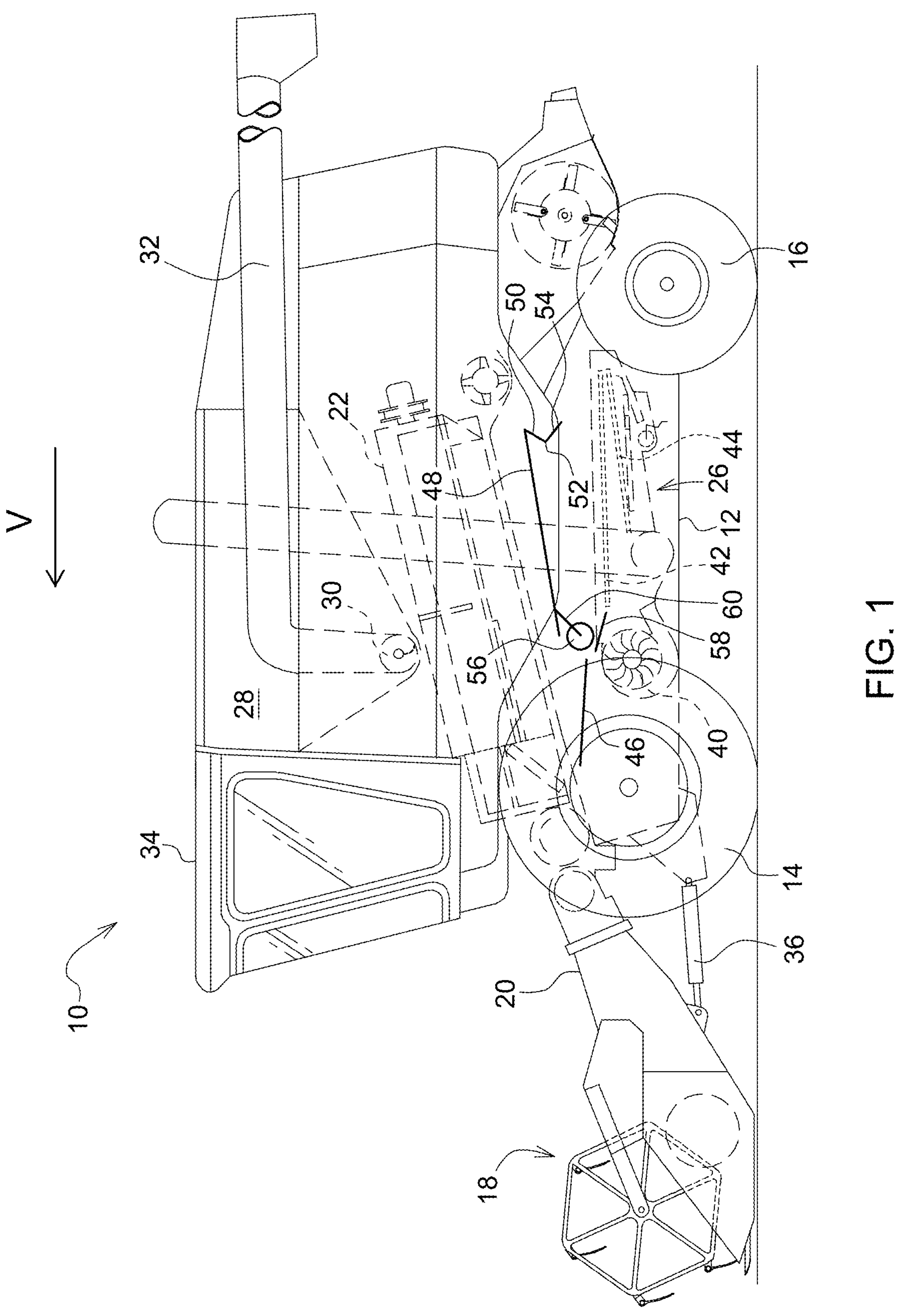
FIG. 1 shows a schematic lateral view of a combine harvester.

FIG. 1 shows a self-propelled harvesting machine in the form of a combine harvester 10 with a chassis 12, which is supported on the ground via driven front wheels 14 and steerable rear wheels 16 and is moved by them. The wheels 14, 16 are rotated by means of drive equipment not shown in order to move the combine harvester 10 e.g., over a field to be harvested. In the following, directions, such as front and rear, refer to the direction of travel V of combine harvester 10 in harvesting operation, which runs to the left in FIG. 1.

To the front end area of the combine harvester 10, a harvest attachment 18 in the form of a cutting platform is detachably connected in order to harvest crops in the form of grain or other threshable stalks from the field at the harvester and to feed it upwards and backwards by an feederhouse assembly 20 to an axial threshing unit 22. The mixture in axial threshing unit 22 passing through threshing baskets and grates, containing grains and impurities, enters a cleaning assembly 26. By the cleaning assembly 26, cleaned grain is fed by means of a grain screw to a grain elevator, which transports it into a grain tank 28. The cleaned grain from grain tank 28 can be unloaded by an unloading system with a transverse auger 30 and a discharge conveyor 32. These systems are driven by a combustion engine and controlled and controlled by an operator from a driver's cab 34.

The cleaning assembly 26 comprises, in a manner known per se, an upper sieve 42 and a lower sieve 44, which are provided by a blower 40 with an air flow through the sieves 42, 44 to the rear and upwards. The grain (threshed out) in the front area of the axial threshing unit 22 is conveyed backwards by a front vibrating floor conveyor 46. The grain (separated) removed from the crop in the rear area of the axial threshing unit 22 is conveyed forward by a rear vibrating floor conveyor 48. The grain conveyed by the vibrating floor conveyors 46, 48 is fed to the upper sieve 42 by another vibrating floor conveyor 58, which could also be designed as pre-sieve (chaffer) 58. The size of the sieve openings and the speed of the blower 40 can be changed in a known manner by an automatic cleaning setting or by the operator from the driver's cab 34.

The rear vibrating floor conveyor 48 is suspended on both sides on front hangers 60 and rear hangers 50. The hangers 60, 50 are each supported with one end freely rotatable on a frame of the vibrating floor conveyor 48 and with another end freely rotatable on the cleaning shoe 66 (see FIG. 2). The rear hangers 50 are rigidly connected to levers 54, which in turn are coupled with a drive mechanism (not shown) that sets the levers 54 in a movement in which the rear hangers 50 rotate continuously around themselves around an angular range around the bearing point 52, where they are supported by the cleaning shoe. Further details on the installation and drive of the rear vibrating floor conveyor 48 can be found in EP 3 498 078 A1, the disclosure of which is included by reference in the present documents.

Below the front end of the rear vibrating floor conveyor 48 (and thus downstream of the vibrating floor conveyor 48 and upstream of the pre-sieve 58 or the upper sieve 42) a transverse auger conveyor 56 is attached, which serves to improve the lateral distribution of the harvested material within the cleaning shoe. The transverse auger conveyor 56 comprises a central shaft 62 and one or more conveyor coils 64 attached to it. Based on the sensorially detected lateral inclination of the combine harvester 10 and/or a sensorially detected distribution of the grain over the width of the cleaning assembly 26, the direction of rotation and speed of the transverse auger conveyor 56, which can be driven by means of a motor 68 (see FIG. 3), is automatically determined in a manner known per se (see U.S. Pat. No. 3,581,746 A, EP 3 501 259 A1) to balance the distribution of the crop at the inlet of the cleaning assembly 26.

The shaft 62 of the transverse auger conveyor 56 is on its outer end provided with a central recess and there connected with a separate shaft section 78 entering there with an end side protrusion, the shaft section 78 extending within the wall of the cleaning shoe 66 and on its end in drive connection with the motor 68. The shaft section 78 is bolted to the shaft 62 with a screw 80 extending axially within the interior of the shaft section 78 and there preferably additionally rotationally fixed by a toothing. This two-part arrangement of shaft 62 and shaft section 78 makes mounting of shaft 62 easier since the dimension of the shaft 62 correspond to the distance between the side walls of the cleaning shoe 66 and thus can be easily mounted and dismounted.

Figure 2:
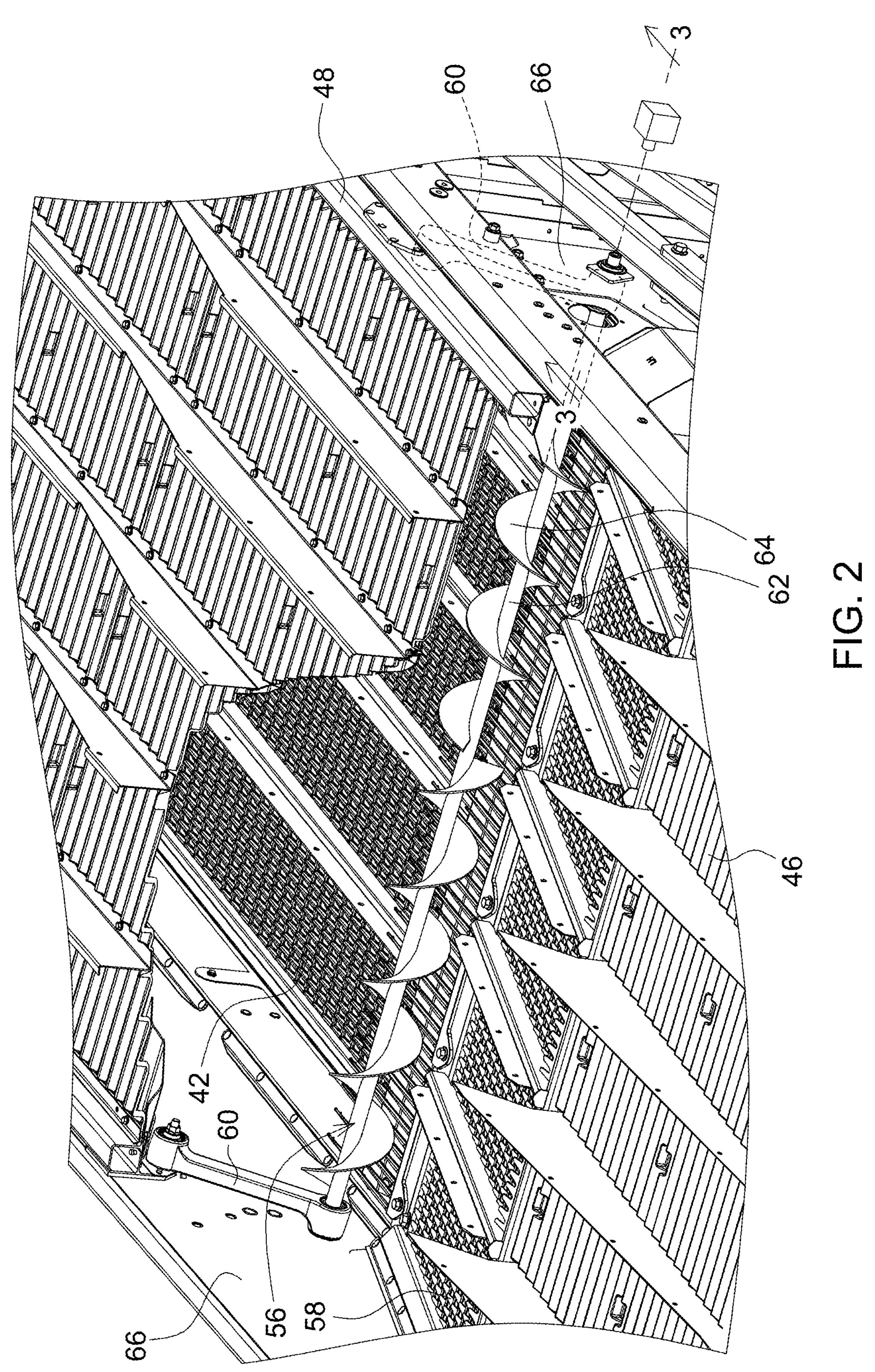
FIG. 2 shows a perspective view of the cleaning assembly of the combine harvester FIG. 1 from the front and top left.
Figure 3:
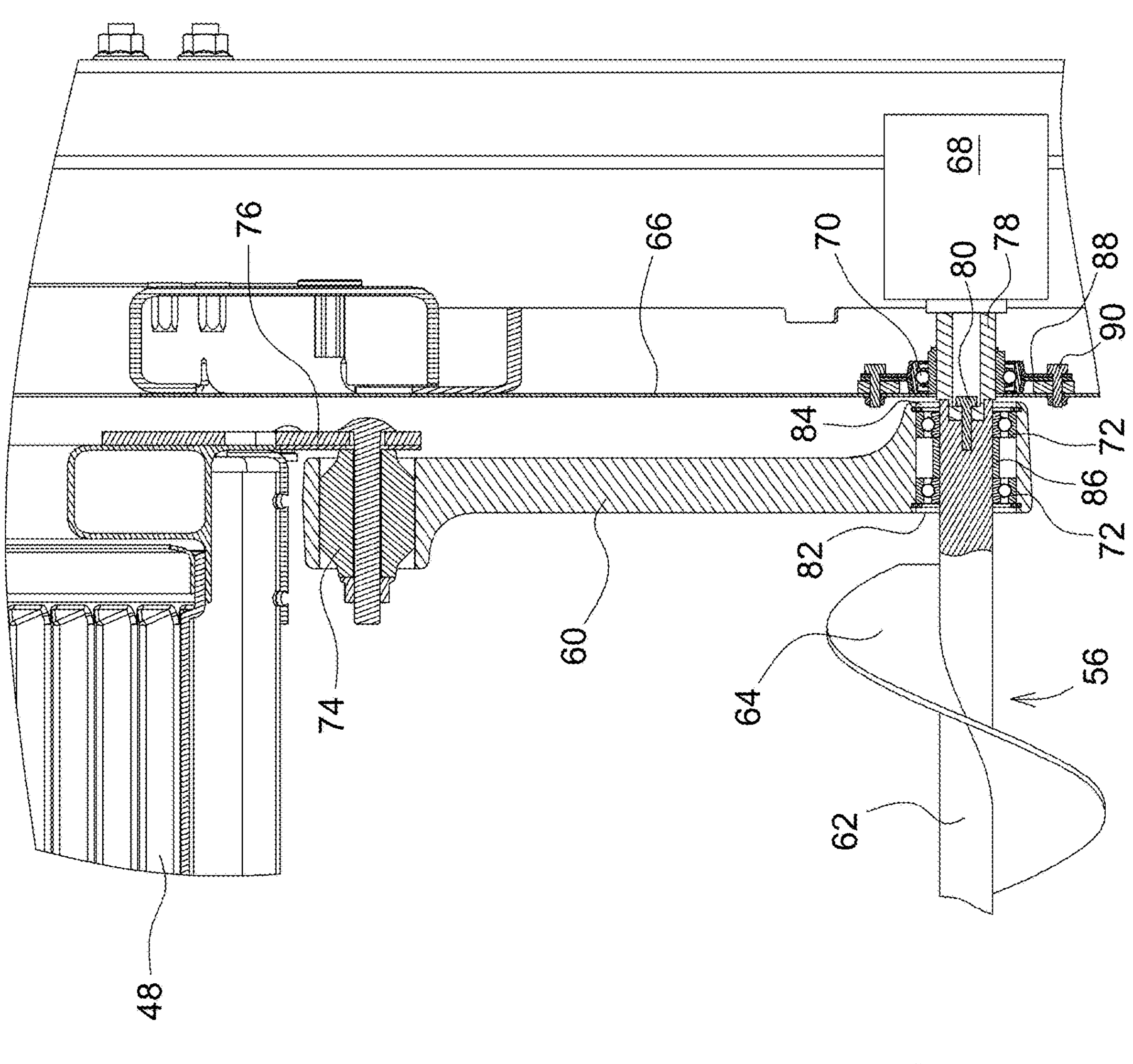
FIG. 3 shows a section along the lines 3-3 of FIG. 2.

As indicated in FIG. 1 and shown in more detail in FIGS. 2 and 3, shaft 62 of the transverse auger conveyor 56, which is rotatably supported by bearings 70 on the wall of the cleaning shoe 66 in the area of the shaft section 78 by a holder 88 and bolts 90, also serves to support the front arms hangers in its outer end areas. For this purpose, the outer end areas of shaft 62 are free of conveyor coils 64 and accommodate bearings 72, on which the hangers 60 are supported. The other ends of the hangers 60 are connected via further bearings 74 with a mounting plate 76, which in turn is connected to the rear vibrating floor conveyor 48.

An axial fixing of the bearings 72 on the shaft 62 can be provided by lock rings 82, 84 on both sides of the bearings 72, which are mounted by spring force on the shaft 72 and on which the bearings 72 abut. One could also provide recesses within shaft 62 in which the lock rings 82, 84 enter. Further on, one could mount a ring 86 on the shaft 62 between the bearings 72 on which the bearings 72 abut and are thus axially fixed. On the other side, not shown in FIG. 3, the shaft 62 can be supported in an analogous manner as in FIG. 3, wherein however not motor 68 is provided there. Also, the hanger 60 is supported there in the manner shown in FIG. 3.

In this way, the shaft 62 serves not only to support the conveyor coil 64, but also the hanger 60, which reduces the effort required to attach the rear vibrating floor conveyor 48.

It should be noted that a number of modifications of the shown implementation are possible. For example, the motor 68 can be replaced by the drive train with which the movable elements of the cleaning assembly 26 are driven, if necessary, using a transmission for rotation direction inversion and of switchable clutches in order to achieve the control of the transverse auger conveyor 56 as described above.

Further on, FIG. 2 shows that the transverse auger conveyor 56 comprises two oppositely directed conveyor coils 64 on its two sides. Thus, the crop is fed to the center, respectively and delivered there, thus making it possible to let the transverse auger conveyor 56 be driven continuously by the motor 68 or as described in the preceding paragraph. Alternatively, a single conveyor coil 64 could be used, extending over the entire width, which is controlled as described above based on lateral slop or the material distribution. Also, it would be possible to use two separately driven conveyor coils 64 on both sides of the transverse auger conveyor 56, as described in EP 3 501 259 A1.

While exemplary implementations incorporating the principles of the present disclosure have been described herein, the present disclosure is not limited to such implementations. Consequently, this application is intended to cover any variations, uses, or adaptations of the disclosure using its general principles. Further, this application is intended to cover such departures from the present disclosure as come within known or customary practice in the art to which this disclosure pertains.

The invention claimed is:

1. A cleaning assembly for a combine harvester comprising:

a vibrating floor conveyor for conveying crops, which is configured to be moved into a vibrating movement and supported swivellingly at its downstream end on a cleaning shoe by hangers;

at least one sieve mounted in the cleaning shoe configured to be loaded with an air flow by a blower; and a rotatable transverse auger conveyor arranged downstream of the vibrating floor conveyor and upstream of the at least one sieve for lateral conveying of the crop, the transverse auger conveyor including a shaft and an attached conveying coil, wherein the hangers are mounted on the shaft of the transverse auger conveyor.

2. The cleaning assembly of claim 1, wherein the vibrating floor conveyor is configured to feed crop discharged from a separating device to a front dispensing edge of the vibrating floor conveyor.

3. The cleaning assembly of claim 2, wherein the transverse auger conveyor is arranged beneath the front dispensing edge of the vibrating floor conveyor.

4. The cleaning assembly of claim 1, wherein the shaft is releasably connected to an outer shaft section extending through a side wall of the cleaning shoe and there rotatably supported on the side wall by a bearing.

5. The cleaning assembly of claim 4, wherein a motor for driving the shaft is coupled to the outer shaft section on an outer side of the cleaning shoe.

6. The cleaning assembly of claim 1, further comprising shaft bearings for rotational support of the hanger, wherein shaft lock rings are provided on an outer side of the shaft bearings for rotational support of the hangers and the shaft lock rings are coupled to the shaft for axially fixing the hangers to the shaft.

7. The cleaning assembly of claim 6, wherein between the shaft bearings a ring is mounted to the shaft for axially fixing the shaft bearings on the shaft.

8. The cleaning assembly of claim 1, wherein a rotation speed and direction of a motor for driving the shaft is automatically controllable based on at least one of a sensed laterally inclination of the combine or a sensed distribution of a grain over the width of the cleaning assembly.

9. The cleaning assembly of claim 1, wherein the transverse auger conveyor includes at least one of two oppositely directed conveyor coils on its two sides, a single conveyor coil over the entire width, or two separately driven conveyor coils on both sides.

10. The cleaning assembly of claim 1, further comprising:

a pair of shaft bearings that support the shaft in the cleaning shoe;

an axial fastener that axially fastens the outer shaft section to the shaft;

at least one lock ring disposed between the pair of shaft bearings, the outer shaft section being axially fixed to the shaft by the at least one lock ring; and a toothing configured to rotationally fix the outer shaft section to the shaft.

11. The cleaning assembly of claim 1, wherein at least one of a rotation speed and a rotation direction of the shaft of the transverse auger conveyor is controlled based at least on a sensed distribution of a crop over a width of the cleaning assembly.

12. A combine harvester comprising:

an axial threshing unit; and a cleaning assembly located next to the axial threshing unit and configured to receive crops, wherein the cleaning assembly includes: 1) a vibrating floor conveyor for conveying the crops, which is configured to be moved into a vibrating movement and supported swivellingly at its downstream end on a cleaning shoe by hangers, and 2) at least one sieve mounted in the cleaning shoe which is configured to be loaded with an air flow by a blower and a rotatable transverse auger conveyor arranged downstream of the vibrating floor conveyor and upstream of the sieve for lateral conveying of the crop, the transverse auger conveyor including a shaft and an attached conveying coil, wherein the hangers are mounted on the shaft of the transverse auger conveyor.

13. The combine harvester of claim 12, wherein the shaft is releasably connected to an outer shaft section extending through a side wall of the cleaning shoe and there rotatably supported by a bearing.

14. The combine harvester of claim 13, wherein a motor for driving the shaft is coupled to the outer shaft section on an outer side of the cleaning shoe.

15. The combine harvester of claim 12, wherein the vibrating floor conveyor is configured to feed crop discharged from a separating device to a front dispensing edge of the vibrating floor conveyor.

16. The combine harvester of claim 15, wherein the transverse auger conveyor is arranged beneath the front dispensing edge of the vibrating floor conveyor.

17. The combine harvester of claim 12, wherein a rotation speed and direction of a motor for driving the shaft is automatically controllable based on at least one of a sensed laterally inclination of the combine or a sensed distribution of a grain over the width of the cleaning assembly.

18. The combine harvester of claim 12, wherein the transverse auger conveyor includes at least one of two oppositely directed conveyor coils on its two sides, a single conveyor coil over the entire width, or two separately driven conveyor coils on both sides.

19. The combine harvester according of claim 15, further comprising shaft bearings for rotational support of the hanger, wherein shaft lock rings are provided on an outer side of the shaft bearings for rotational support of the hangers and the shaft lock rings are coupled to the shaft for axially fixing the hangers to the shaft.

20. The combine harvester according to claim 19, wherein between the shaft bearings a ring is mounted to the shaft for axially fixing the shaft bearings on the shaft.

* * * * *